Feb. 28, 1967   D. L. CAMPBELL   3,306,236
BURNER FOR WASTE MATERIALS AND METHOD OF
BURNING WASTE MATERIALS
Filed Sept. 11, 1964
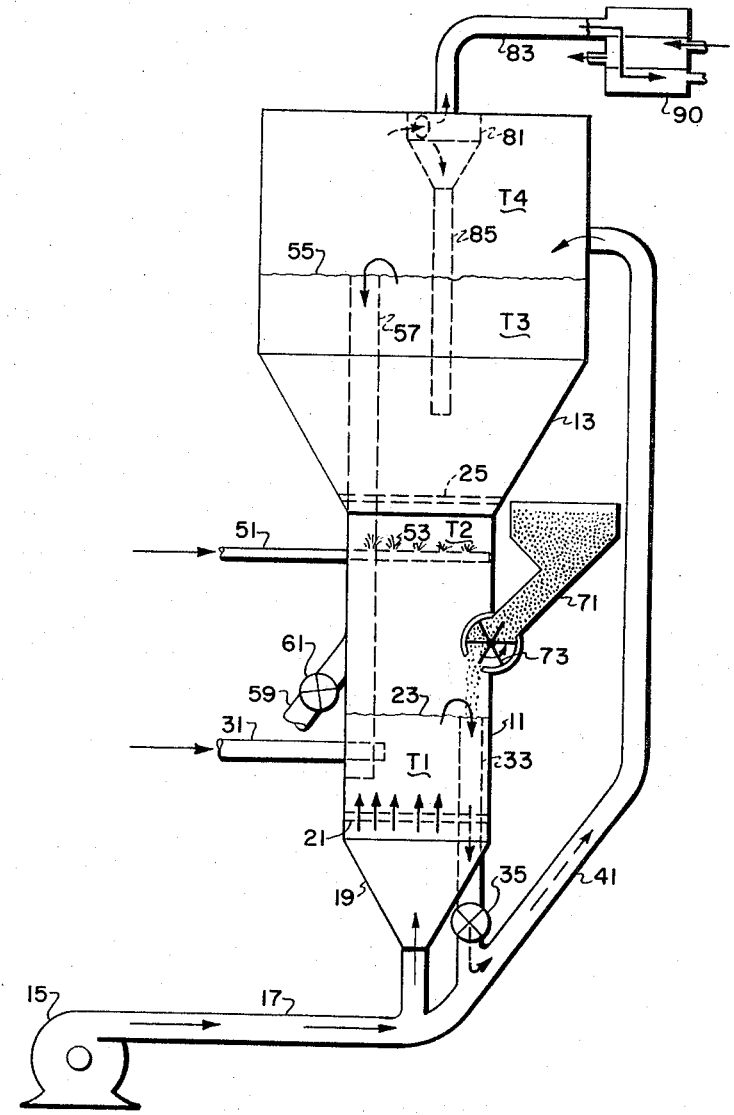
Inventor
DONALD L. CAMPBELL
By Edwin M. Thomas
Attorney

United States Patent Office 3,306,236
Patented Feb. 28, 1967

3,306,236
BURNER FOR WASTE MATERIALS AND METHOD OF BURNING WASTE MATERIALS
Donald L. Campbell, Short Hills, N.J., assignor to Esso Research and Engineering Company, a corporation of Delaware
Filed Sept. 11, 1964, Ser. No. 395,777
15 Claims. (Cl. 110—8)

The present invention relates to an improved burner for waste materials, i.e. for wastes which may contain gases, solids and/or liquids. It has particular application to a burner for consuming various kinds of waste materials, e.g. sewage, which contain large quantities of incombustibles. The burner operates on the fluidized-solids principle. Fine particles of refractory material are used as heat carriers. A multiple bed arrangement is employed with one dense fluid solid bed preferably arranged above another. Elastic fluids, which may be either gases or vapors or both, are used to keep the dense beds fluidized.

Various schemes have been proposed in the past for large scale disposal of waste products, such as municipal garbage and sewage products. According to the present invention, a plurality of dense fluidized solid beds are used. These beds are composed of fine particles of refractory material and are supported in suitable vessel compartments arranged one above another. For example, in a two-bed system, gases will travel up through the two beds in series. Air is blown into the bottom of the lower bed, where it will pick up products of distillation, cracking, partial combustion, and fuller combustion. Thereupon, supplementary fuel is added as above the lower dense bed, i.e. in the vapor space between the bottom fluidized bed and the bed above. The hot flue gases from the combustion zone above the lower bed, as well as vapors and gases from this bed, then pass upwardly through the upper bed. Resulting products of complete combustion then are passed out of the burner through any suitable separating equipment that may be required for removing the solids from the effluent gas stream. The cleaned gases then may be discharged to the atmosphere. Desirably, a heat exchange may be installed at the discharge line to make efficient use of the energy in the hot discharge gases.

The solids which remain in the system are circulated continuously from an upper bed to a lower bed and back again to the upper bed. More than two beds, of course, can be used if desired. A suitable means for accomplishing this circulation of solids is a standpipe or downcomer which extends downwardly from the lower bed, solids being carried from its outlet by an air lift to the upper bed. This standpipe may be kept fluidized if desired. In the upper bed an overflow, i.e. another downcomer, is provided for solids to return to the lower bed. Vessel construction of this general type, with some modifications, is known broadly in the petroleum refining art. In the present case, however, the lower bed is maintained as a stable, mobile dense phase of solids at a temperature suitable to insure gasification or vaporization in some way of everything coming into the lower bed except the refractory solids and the ash content of the waste material. Under suitable time and oxidizing conditions, this temperature may be set as desired, a good workable example being about 1000° F.

At the temperature of the lower bed, any waste material fed into such bed, whether in liquid or solid form, will be either vaporized, cracked, partially burned or completely burned. As a result, only the ash will generally remain as a solid to be deposited on or mixed with the refractory particles which comprise the dense fluid bed. Heat is supplied to the dense lower bed per se mainly by a stream of solids coming in at a controlled and predetermined temperature. This temperature of incoming solids may be varied considerably but it must be at least somewhat above the operating temperature of the lower bed if the latter is to be kept at its working temperature of, say, 1000° F. The hot stream of incoming refractory particles preferably comes from the single upper bed, but if desired it may come from a plurality of upper beds. The various gases and vapors leaving the lower bed, as a result of partial decomposition or incomplete combustion of waste products, are of a nature that they may still be serious atmospheric pollutants. That is, they may be either dangerous or at least of nuisance type. For example, they may contain odorous or noxious compounds; they may contain carbon monoxide, or incompletely burned organic sulfurous materials, and/or they may contain hydrogen due to incomplete combustion.

Therefore, an important feature of the invention is the introduction into the lower zone of additional or supplementary fuel, besides the waste materials. Such fuel is fed into the vapor space above the lower dense bed and is required to heat the gases and vapors to some higher temperature level, usually considerably above that at which these materials come off the bed. For example, the vapors and gases may be heated to a temperature of about 2000° F. while the bed operates at only about 1000° F. It will be understood, of course, that both these temperatures may be varied quite widely. At the temperature to which the vapors and gases are ultimately heated, all products coming off the lower bed will be completely converted to combustion products, such as $CO_2$, $H_2O$, $SO_2$, or $SO_3$, etc.

The hot vapors and gases coming off the lower bed are then passed through the upper bed in order to conserve their heat. As a result they raise the solids in the upper dense bed to an elevated temperature substantially above the temperature in the lower bed. This elevated temperature may be varied rather widely, but is preferably such that the heat of the flue gases given up in cooling from, say, their high temperature of about 2000° F. to the upper bed temperature at least equals in sensible heat the increase in heat required by the stream of solids circulating from the lower bed at 1000° F. to the upper bed at an intermediate temperature. Suppose this intermediate temperature is designated as X° F., this means that the flue gases in cooling from 2000° F. to X° F. will give up as much heat as is required to raise the stream of solids coming in from the lower bed to the temperature of X° F.

The primary control of temperature of this system thus is established by the lower bed. Supplementary fuel is to be fired in sufficient quantity to maintain this basic temperature in the lower bed. In most cases, such control will automatically require that the temperature in the vapor space above the lower bed be considerably higher than the temperature in the lower bed itself. The reason for this is that most waste materials will not supply sufficient overall heat for their own combustion. In some cases they may supply sufficient heat, in which case, of course, supplementary fuel will not be necessary. Ordinarily, due to the presence of a lot of water in the waste material, supplementary fuel must be fired to obtain an overall heat balance.

It is a particular advantage of the present invention that it can be used to burn material containing a very large proportion of water. As a matter of fact, a possible charge material is sewage which has been concentrated to only about 10 percent solids, still containing about 90 percent water. On the other hand, some waste materials may have excess fuel value. Thus if a waste material is to be fed which is of high heating value, say a stream that is 90 percent oil, then water can be deliberately charged into the lower bed to keep its temperature down. The more water that is fed into the lower temperature bed, with the fuel controlled to maintain the desired lower bed temperature, the higher will be the temperature of the vapor space between the bed. Or, conversely, with high fuel value in the lower bed, more water can be added above it. Thus water injection can be used if necessary to increase this vapor space temperature.

The rate of fluidizing gas, i.e. of air flow through the lower bed should be maintained substantially constant at all times in order to insure good fluidization and adequate mixing of the refractory particles which constitute the bed and the solid materials which are coming in or being derived from the waste supply. The rate of refractory solids cycling between the beds also is preferably maintained substantially constant. Some variation may be permitted in suitable cases.

One advantage of the system in the present invention is that any kind of waste material can be charged. Thus, a waste gas can be fed between the two beds and readily burned to its final combustion productions. The mobile bed will pick up the solid residue. A liquid or any desired water content, even approaching 100 percent, can be fed into the system and consumed fully by adjusting the fuel rate in the vapor space above the lower bed. A slurry of water with oil and/or solids also can be fed so that solids in any form—paper, boards, filter clay or any other materials—can be brought into the system. It is quite immaterial whether the materials are combustible or not. The operating temperature of the lower bed, say about 1000° F., is low enough that in nearly all cases the ash from the solids will not fuse. Hence, there is generally no problem of agglomeration of the refractory particles. If it should be found that agglomeration is being encountered, the temperature can be reduced moderately. Thus, in most cases, any ash made will deposit on the refractory material. There may be a few cases in which fly ash is made, but this can be recovered, if necessary, by the use of cyclones or precipitators of well known types.

According to the present invention, waste gases or liquids can also be charged to the burner through pipes along with the fuel gas or liquid. Also, the latter may be discharged either into the lower bed in part or entirely above it. The same is true of waste liquids. Solids can be charged through a lock hopper arrangement into the vapor space above the lower bed. Where necessary, refractory solids needed to maintain proper fluidity in the dense beds may also be added from time to time, or even continuously if required and in the same manner.

The invention will be more fully understood by reference to the accompanying drawing which forms a part of this specification.

In the single figure there is shown in elevation a single burner structure or vessel which involves a lower burning zone 11 and an upper burning zone 13. Both of these zones are fluidized by passing gases, preferably air, upwardly through them. A suitable blower for the air, driven by a motor not shown, is indicated at 15. It supplies compressed air through a line 17. A substantial part of this air flows upwardly into a bottom zone 19 of the lower burner and into the fluid solids bed through a perforate grid 21. The volume and velocity of the air is such as to fluidize and maintain fluidity in the solids in the lower burner in a well known manner. Gases passing through or generated in the bed continue to rise from the bed through the intersurface 23. The latter defines essentially the top of the dense phase fluid solids in the lower vessel. The gases, and vapors which may be included, pass on up into the bottom of the upper burner vessel 13 and through a perforate grid 25, on which another bed of fluidizable solids is supported. The action of the rising gases of course fluidizes the latter solids in the same general manner as in the lower bed.

Fluid materials to be burned, which may comprise gases, or liquids, or solid matter suspended in gas or liquid, etc., will be introduced to the lower zone and preferably directed into the lower bed through a line 31. As the vapors and liquids are consumed or vaporized, etc., residual solids such as ash, or carbon in some cases, will be deposited upon the more refractory solids, which comprise the major part of the original solids in the lower vessel. As the total volume of these deposited and original solids increases, the excess will flow over a downcomer or standpipe 33. This standpipe may be partly under control of a valve 35. By suitable adjustment of valve 35, and especially by suitable aeration to maintain fluidity in the line 33 above it, which will usually be desirable, the flow rate of solids down the standpipe can be controlled.

A portion of the air stream from blower 15 also passes into branch line 41. The descending solids from the interface 23 pass down through the standpipe 33 and are picked up by the gas or air passing upwardly and to the right in line 41. By this means, the solids are carried up into the top of the upper vessel 13. They fall into and augment the upper dense bed and add their heat to it.

A fuel, which may be either liquid or gas, or a mixture, is introduced into the gas space above the interface 23 in the lower vessel through a line 51. Line 51 conveys the fuel to a burner 53 where it is consumed, adding substantial heat to the rising gases from the interface 23. The latter, plus the products of fuel combustion, pass upwardly through the grid 25 into the upper burning zone 13. By this means the temperature of the solids in the upper vessel or compartment may be made substantially higher than that of the solids in the lower vessel or compartment. These solids form a dense phase having an interface as indicated at 55. As they build up, they overflow through the downcomer 57, thus being returned to the lower bed. A branch withdrawal line 59 is provided in the downcomer 57, a valve 61 being installed therein to control the withdrawal of solids from the system. The withdrawal rate will, of course, depend on the amount of ash and other incombustibles coming into the system from the waste products being burned.

Solids, either waste products or replenishment refractory particles, may be introduced into the lower bed from a hopper 71. This is under control of a star wheel or lock hopper arrangement 73, as will be well understood by those skilled in the art. Several such devices are known and used by which the solids may be added without letting gases escape from the vessels. These solids may be waste matter which itself contains the needed refractory materials to replenish those which are removed by attrition or by mixture with ash which is withdrawn, or they may consist merely of solid waste products to be consumed in the burner. In the latter case, it may be necessary to add small amounts of refractories from time to time or even continuously, to keep the bed composition of desired constituency.

The vessel may be constructed as a single unit with walls of suitable material, such as steel, lined with refractory brick or cement, etc. Alternatively, separate vessels may be superimposed. The temperature $T_1$ in the lower bed is sufficiently high, after the system gets in operation, to insure gasification in some way, e.g. at least vaporization or partial cracking, etc., of all the waste products except their ash or perhaps their carbon content. For example, a good working temperature is about 1000° F. It may be less, but preferably will not be below about 800° F. nor more than about 1200° F. in most cases. At these temperatures in the lower fluidized bed, any waste material supplied thereto, whether in liquid or solid form, will either be vaporized, or cracked or burned, at least to some extent. Generally speaking, ash will remain as the chief solid component and it is deposited on or mixed with the refractory particles constituting the original bed. Heat for the lower fluidized bed is supplied primarily by the stream of solids flowing down the downcomer 57 from the upper level. Gases passing upwardly from the interface 23 of the lower bed ordinarily will not be completely consumed or oxidized at this point. They will contain highly undesirable atmospheric pollutants of at least a nuisance type. They may even be dangerous in some situations, if they were released in such condition. They may contain odorous compounds and/or incomplete combustion products such as carbon monoxide or hydrogen, $H_2S$, etc. The additional fuel injected through line 51 is intended to burn these materials completely. It is designed also to heat the rising gases in the vapor zone to a temperature $T_2$ substantially higher than $T_1$, say about 2000° F. At this temperature all the gaseous and vapor products passing to the zone above are essentially completely converted to their final oxidation products, such as $CO_2$, $H_2O$, $SO_2$, or $SO_3$.

The hot gases including the complete combustion products then pass through the upper bed. They impart some but not all of their heat thereto. Hence the upper bed will have a temperature $T_3$ substantially higher than that of the lower bed, though less than $T_2$. Finally, the gases emerging from the upper bed have a temperature $T_4$ at which they are passed through the solids separating device such as a cyclone 81 with its outlet line 83. Separated solids return to the upper bed through downspout 85 in the conventional manner. The gases passing out through line 83 are completely innocuous, or substantially so. They preferably go through a heat exchanger 90 where they are cooled, their heat content being used to generate steam or for such other useful purposes as may be desired.

The arrangement, in essence, is such that the gases rising from a lower zone through the upper fluidized bed give up a certain amount of heat, which heat equals, of course, the sensible heat of the stream of solids circulating back to the lower bed. The solids which rise through line 41, leaving the lower bed at a temperature $T_1$, for example, of about 1000° F. will reach the higher temperature $T_3$ in the upper vessel. The difference is essentially the heat applied to vaporization, combustion, cracking, etc., of the waste products fed into the lower bed through line 31.

The primary point of control of the system, as previously mentioned, is the temperature of the lower bed. It is controlled eventually of course by firing supplementary fuel above the bed, in suitable quantity, the heat being imparted first and mainly to the solids in the bed above, which reach the temperature $T_3$.

In many cases the supplementary fuel added through line 51 need be only very small in quantity. When there is enough fuel value in the waste products being consumed to substantially meet all heat requirements, fuel will not be required at all. Generally speaking, however, with waste products such as sewage which contain a great deal of water, often around 90 percent, fuel for line 51 will be required. The fuel feed rate through line 51 is generally controlled in accordance with the water content of the waste products being consumed, as previously mentioned.

The rate of air flow from the pump 15 is generally substantially constant and is sufficient to insure good fluidization and proper mixing in the two beds as well as solids circulation between them. The rate of refractory solids cycling between the two beds also is preferably maintained substantially constant. As previously indicated, surplus solid materials, if and as they accumulate, may be withdrawn through line 59.

It may be necessary, under some conditions, to supplement or occasionally replenish the solids which constitute the fluidized beds. For this purpose refractory solids of suitable type such as granules of metal oxides, metallic particles, ceramic particles, etc., and mixtures thereof may be added to the hopper 71 and its feed wheel 73. The prior art contains examples of many materials suitable for this purpose.

Since the temperature in the lower bed is generally rather moderate, the grid or grate 21 at the bottom thereof usually can be made of relatively inexpensive materials. Preferably an alloy is used which is reasonably resistant to oxidation at the operating temperatures. In cases where the waste solids include pieces of metal or other solids too large to fluidize, these may accumulate on the grate and may require periodic removal therefrom. This may be done either through a suitable cleanout (not shown) or by shutting down the system and removing grid 21, etc. Generally speaking, the upper bed will not require a grate in the sense of a support for massive solids.

Normally, the first dense fluid solids bed is arranged beneath the second and is at lower temperature, the temperature between the two beds being higher than either. In some cases the beds need not be superimposed in this manner. The second bed supplies heat to the first by solids circulation.

Obviously, an intermediate bed can be installed between zone 11 and zone 13 if desired, making three beds in all, if desired. However, the arrangement shown is adequate for most purposes and is generally preferred. It will be understood, however, that various changes including those mentioned and others not mentioned but self-evident to those skilled in the art may be made in the system without departing from the spirit of the invention. It is intended by the claims which follow to cover such as would occur to those skilled in the art.

What is claimed is:

1. A burner for consuming various kinds of waste materials which may comprise solids and/or fluids, said burner comprising, in combination, a lower vessel compartment, means for maintaining at a temperature to cause substantial vaporization of said waste materials a mass of dense fluidized solids in the lower part of said lower vessel compartment, means for passing the vapors so generated on said fluidized solids upwardly, means for augmenting the heat in said upwardly passing vapors, said means located upwardly of said mass of dense fluidized solids in the lower part of said lower vessel compartment, an upper vessel compartment containing a further mass of fluidized solids maintained at a higher temperature than said mass of dense fluidized solids in the lower part of said lower vessel compartment and through which said augmented heated vapors pass, means for circulating solids continuously from each vessel compartment to the other means for withdrawing consumed waste solids, said means located between said upper and lower vessel compartments, and means for eventually passing all the gaseous and vaporous products, including fluid combustion products, overhead.

2. A burner for disposing of wastes containing large quantities of non-fuel materials which comprises, in combination, a lower vessel compartment, means for fluidizing refractory solids in said lower vessel compartment at a temperature sufficiently high to volatilize substantially the volatilizable combustible materials in said waste products, means for adding fuel to said volatilized products upon their exit from said refractory solids in said lower vessel, means for supplying air to obtain substantially complete combustion of all the combustible waste products and of said fuel, an upper vessel compartment adapted to contain a mass of fluidized solids and arranged above the zone of combustion of said added fuel, means including the fluid support of the combustion products rising from the lower compartment for maintaining a mass of fluidized solids in said upper vessel compartment, means for passing the final combustion products overhead out of said upper compartment, means for removing solids from said final products and returning them to the upper compartment, and means for maintaining predetermined levels of solids in both said upper and lower beds while maintaining a substantially higher temperature in the upper vessel than in the lower.

3. In combination, a dual fluidized solids combustion vessel comprising a lower compartment adapted to contain relatively mildly heated solids in a fluidized state, and an upper compartment adapted to contain hotter solids, means for introducing solids for burning into said lower compartment, means for introducing fluidizing air into the bottom of said lower compartment, means for introducing supplemental fuel into said lower compartment at a point above the fluidized solids contained therein, thereby to augment the temperature of the stream of rising gases and vapors, means for supporting fluidized solids in the upper compartment comprising a grid through which the stream of rising gases and vapors from the lower compartment passes upwardly, means for returning a stream of relatively hot solids from the upper compartment to the lower, and means outside the vessel for carrying a stream of relatively cooler solids from the lower vessel to the upper.

4. Combination according to claim 3 wherein a lock hopper is provided for adding solid materials to the lower vessel.

5. Combination according to claim 3, wherein means are provided for feeding a stream of waste material directly into the dense fluidized solids in the lower compartment.

6. In a system of the character described, the combination which comprises a single vessel having an upper and a lower fluidized bed compartment, means beneath said lower compartment for maintaining a fluidized bed of solids therein, means in said lower compartment for injecting a fuel stream above said bed of solids, means in said upper compartment for maintaining a fluidized dense bed of solids substantially supported by rising elastic fluids from the lower compartment, and means for maintaining a relatively high temperature in the lower compartment above its fluidized bed, a lower temperature in the bed above, and a still lower temperature in the bed below.

7. In a system according to claim 6, a means for separating entrained solids from elastic fluids including combustion products leaving the vessel.

8. In a system according to claim 6, a means for extracting useful heat from elastic fluids leaving the vessel.

9. A method of burning waste products including high percentages of incombustible material, which comprises feeding said products into a moderately heated air-fluidized dense first bed of refractory solids to effect substantial vaporization and at least incipient combustion of combustible materials in the waste products, substantially increasing the temperature of the vaporization and incipient combustion products after they leave said first bed, passing said last mentioned products upwardly through a second fluidized solids bed to transfer heat thereto, and transferring solids from the second bed to the first bed to maintain operating temperature of the first bed.

10. Method according to claim 9 wherein supplementary fuel is burned to increase the temperature of the vaporization and incipient combustion products after they leave the first bed.

11. Method according to claim 9 wherein useful heat is extracted from the final fluid products after they leave the second bed.

12. In a burner for sewage and like products containing high proportions of incombustibles, which comprises, in combination, a refractory lined unitary vessel having a lower compartment, a dense fluid solids bed-supporting grate in said lower compartment, a fuel burner above bed upper level in said lower compartment, an upper compartment directly overlying said lower compartment, a grid for supporting a dense fluid solids bed in said upper compartment, a gas-solids separator in said upper compartment including means for returning separated solids to the solids bed in said upper compartment, means for introducing a stream of sewage and the like into the dense bed of the lower compartment, a means comprising an air blower for forcing air upwardly through both beds in both compartments, and means for flowing solids from each bed to the other.

13. Combination according to claim 12 which includes a standpipe for removing solids from the lower bed and an air lift for carrying them to the upper bed.

14. Combination according to claim 12 which also includes gas tight means for adding extraneous solids to the lower compartment.

15. Combination according to claim 12 which also includes means for removing solids from the system to keep the fluid beds in balance.

References Cited by the Examiner
UNITED STATES PATENTS

| | | | |
|---|---|---|---|
| 2,498,710 | 2/1950 | Roethel | 263—21 X |
| 2,560,356 | 7/1951 | Liedholm | 34—10 X |
| 2,650,084 | 8/1953 | White | 263—21 X |
| 2,789,034 | 4/1957 | Swaine et al. | 263—21 X |
| 3,171,369 | 3/1965 | Stephens et al. | 110—28 |

OTHER REFERENCES

Chemical and Engineering News (publication), May 7, 1962, pp. 82–83.

KENNETH W. SPRAGUE, *Primary Examiner.*